United States Patent
Justice et al.

(10) Patent No.: US 6,367,072 B1
(45) Date of Patent: *Apr. 2, 2002

(54) APPARATUS AND METHOD FOR IDENTIFYING AND MODIFYING COMPUTER OPERATING SYSTEM COMPONENTS

(75) Inventors: Bradley P. Justice, Berkeley; Michael W. Colburn, South San Francisco; Manfred B. Siemsen, San Bruno, all of CA (US)

(73) Assignee: Applica Systems, Inc., Chatsworth, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,848

(22) Filed: Mar. 12, 1998

(51) Int. Cl.⁷ .................................................. G06F 9/45
(52) U.S. Cl. ....................................................... 717/11
(58) Field of Search ............................ 395/712; 717/11, 717/1

(56) References Cited

U.S. PATENT DOCUMENTS

| | | | | |
|---|---|---|---|---|
| 4,833,594 A | * | 5/1989 | Familetti et al. | ............ 364/200 |
| 5,579,509 A | * | 11/1996 | Furtney et al. | ............ 395/500 |
| 5,613,123 A | * | 3/1997 | Tsang et al. | ............ 395/651 |
| 5,859,969 A | * | 1/1999 | Oki et al. | ............ 395/200.3 |
| 5,913,230 A | * | 6/1999 | Richardson | ............ 711/203 |

OTHER PUBLICATIONS

Varhol. Trends in Operating System Design. ACM. pp. 1–8.*

* cited by examiner

*Primary Examiner*—Kakali Chaki
*Assistant Examiner*—Wei Zhen
(74) *Attorney, Agent, or Firm*—Flehr Hohbach Test Albritton & Herbert LLP (57) ABSTRACT

A structure for identifying and modifying a computer operating system components includes a component table including a list of possible components of the operating system. An identifier structure is configured to access the component table and to interrogate the operating system to determine which components in the component table are loaded in the operating system. A build structure is coupled to the identifier structure and configured to compile identified components in the component table and to generate a table of the identified components. The resulting structure defines loaded components of the operating system and can then serve to assist additional structures in modifying the operating system. Modification structures search the table of loaded components to determine how to modify the operating system to achieve desired results. Advantages of the invention include the ability to identify and modify loaded components of the computer operating system. As a result, modification programs can provide for additional functionality not originally provided for in the operating system.

10 Claims, 6 Drawing Sheets

| 160 | |
|---|---|
| Loaded Table | |
| Component F | 162 |
| version | 164 |
| identification information | 166 |
| offset | 168 |
| base location | 170 |
| Component J | 172 |
| version | 174 |
| identification information | 176 |
| offset | 178 |
| base location | 180 |
| . . . . . . . . . . | |
| . . . . . . . . . | |
| . . . . . . . . . | |
| Component M | 182 |
| version | 184 |
| identification information | 186 |
| offset | 188 |
| base location | 190 |

APPARATUS AND METHOD FOR IDENTIFYING AND MODIFYING COMPUTER OPERATING SYSTEM COMPONENTS

FIELD

The present invention relates to an apparatus and method for identifying and modifying computer operating system components. In particular, the invention provides a structure that is capable of determining operating systems components residing in loaded portions of the operating system and dynamically modifying those components in order to restructure the operating system to achieve useful results.

BACKGROUND

Operating systems are well known in the technical field of computers. The operating system is the software that provides the computer hardware with the ability to function. For example, Microsoft Windows 95 is the operating system that is used by many users worldwide in order to provide their computer hardware with the ability to function. This software allows application programs such as Microsoft Word or Correl WordPerfect to function on the computer hardware.

In order to provide the basic functionality of the hardware, the operating system must know what hardware is present in the computer and how the hardware is configured. This includes information such as what type of central processor is present (e.g. Intel Pentium or AMD K6), what type of video card adapter is present (e.g. VGA or SVGA), what type of modem is present and so on. The operating system must also know what software is present in the computer such as drivers for the hardware and software. This information is typically contained in the system or initialization files and directs the processor to the appropriate files to load during initialization.

Conventional techniques for determining hardware and software configuration consist of scanning the computer's hard disk for the system or initialization files or for versions of installed software. For example, when a user purchases an upgrade product for, for example, Microsoft Word 6.0, the upgrade product searches the computer's hard disk for an older version of the product (e.g. version 5.0) for confirmation before loading the upgrade version. Or, for example, a product such as Norton Utilities searches the hard disk for known files such as the system (SYS), dynamic link library (DLL) and initialization (INI) files and determines whether computer operating system is properly configured based on information in these files and the installed software. A limitation of this technique is that it looks to the information on the disk drive and does not provide the ability to identify loaded components of the run-time operating system.

Additionally, some operating systems such as Windows 95 will dynamically load run-time components of the operating system. When these components are activated, a desirable feature is to identify and modify the activated components. Conventional techniques do not provide such a feature.

SUMMARY

The invention overcomes the identified limitations and provides an apparatus and method for identifying and modifying computer operating system components. An exemplary embodiment of the invention includes a component table including a list of possible components of the operating system. An identifier structure is configured to access the component table and to interrogate the operating system to determine which components in the component table are loaded in the operating system. A build structure is coupled to the identifier structure and configured to compile identified components in the component table and to generate a table of the identified components. The resulting structure defines loaded components of the operating system and can then serve to assist additional structures in modifying the operating system.

In another embodiment, the invention further includes a dynamic identifier structure configured to identify components of the operating system that are dynamically loaded. In this embodiment, the build structure is configured to dynamically regenerate the loaded table in order to maintain an up-to-date loaded table of the identified components.

Modification structures use the table of loaded components to determine how to modify the operating system to achieve desired results. For example, the exemplary embodiment is directed to a product for permitting multiple users to use the Windows 95 operating system. This operating system includes at least two portions, including a first portion associated with one state and a second portion associated with a second state, and wherein the first state is for a first user and the second state is for a second user. The operating system further includes a third portion for instructing the operating system where to search for loaded components. The modification structure is configured such that when the first user is activated components associated with the first user are loaded into the operating system and when the second user is activated components associated with the second user are loaded into the operating system.

Advantages of the invention include the ability to identify and modify loaded components of the computer operating system. As a result, modification programs can provide for additional functionality not originally provided for in the operating system.

BRIEF DESCRIPTION OF THE FIGURES

Additional advantages of the invention will become apparent upon reading the following detailed description and upon reference to the drawings, in which.

DETAILED DESCRIPTION

Exemplary embodiments are described with reference to specific configurations. Those skilled in the art will appreciate that various changes and modifications can be made while remaining within the scope of the claims. For example, the preferred embodiment is described for use with the Windows 95 operating system, but the invention is similarly applicable to other operating systems.

Figure 1:
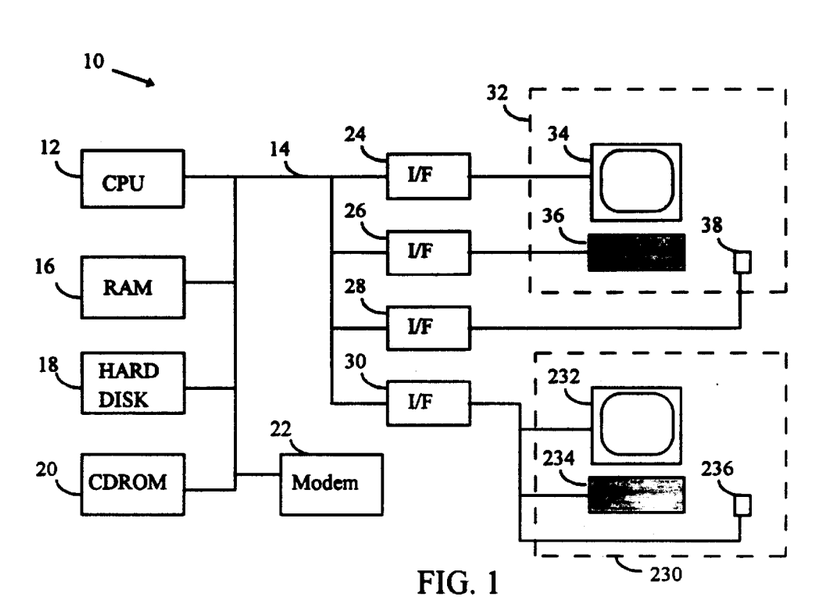
FIG. 1 depicts a computer for use with the invention.

FIG. 1 depicts a computer 10 for use with the invention. The computer includes a number of hardware components. A central processing unit (CPU) 12, which can be for example an Intel Pentium, is connected to a bus 14. The bus is connected to random access memory (RAM) 16, a hard disk disk 18, a CDROM 20 and a modem 22. The bus is also connected to other interfaces (I/F) that communicate with additional hardware. Hardware support for a user interface 32 includes hardware interfaces such as video interface 24, a keyboard interface 26 and a mouse interface 28. The video monitor 34, keyboard 36 and mouse 38 make up the user interface 32. Hardware and software support 30 for a second user interface 230 is more fully described below.

Figure 2:
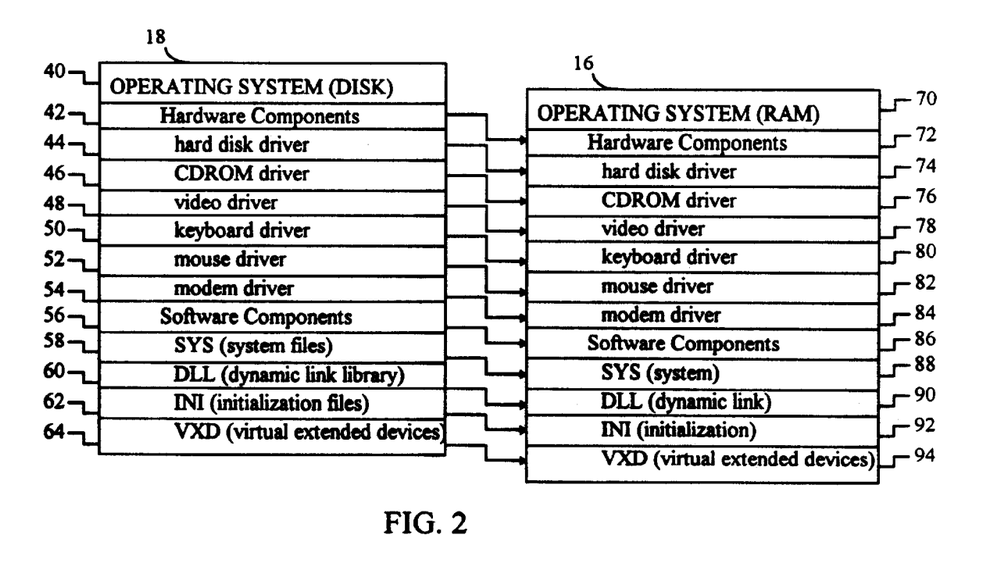
FIG. 2 depicts the operating system for the computer of FIG. 1.
Figure 3A:
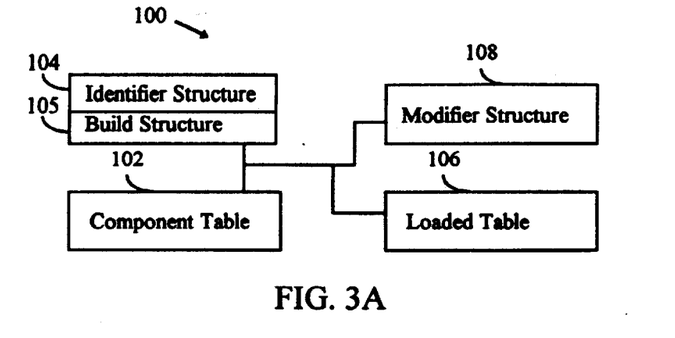
FIGS. 3A–B depict an embodiment of the invention.
Figure 3B:
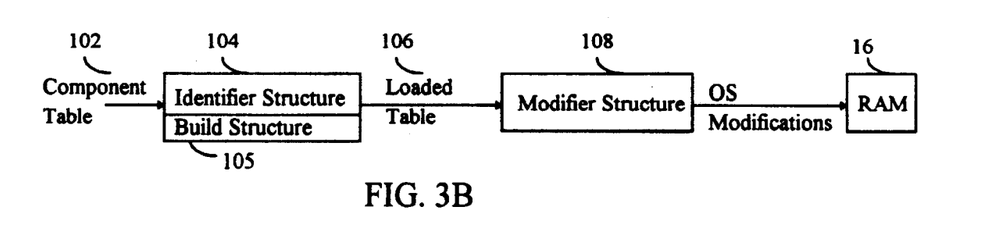

FIG. 2 depicts the operating system 40 for the computer 10. The exemplary embodiment is directed at Windows 95, and that operating system is generally described with reference to operating system 40. The operating system 40 is one that is stored on hard disk 18 and includes all possible components for the operating system. This is, for example, a copy of the CDROM version of Windows 95 as installed on hard disk 18. A set of hardware components 42 are required in order for the CPU to understand how to control the hardware. These drivers include a hard disk driver 42, a CDROM driver 46, a video driver 48, a keyboard driver 50, a mouse driver 52 and many additional drivers that are installed with Windows 95. If hardware is added to the computer 10, either Windows 95 will have a driver for the additional hardware or a diskette will be packaged with the additional hardware to be loaded into Windows 95. A set of software components 56 is also required. Often, the software components are referred to by various names such as libraries or files, but they perform a similar purpose as the hardware drivers: informing the CPU how to control the software. The software components include SYS (system files) 58, DLLs (dynamic link libraries) 60, INIs (initialization files) 62 and VXDs (virtual extended devices) 64. In the Windows 95 operating system, the VXDs are important for defining information such as disk drive mappings and other required information such as allocation of computer RAM, current state of input and output devices and the identity of the logged-in user.

When the computer is turned on, the CPU queries the hardware based on the operating system 40 stored on the disk 18. During this initialization, certain components of the operating system 40 from the disk are loaded into the run-time operating system 70 stored in RAM 16. These components include hardware components 72 and software components 86 corresponding generally to the specific hardware and software present in the computer 10.

FIGS. 3–10 describe embodiments of the invention as applied to the hardware and operating system described. A component table 102 is a list of the components that an application programs would potentially like to modify in the run-time operating system 70. If additional components are added to the operating system, for example by updating the operating system to a newer version, the component table 102 should be updated to reflect the added components. If the invention encounters an unknown component, the invention can also determine the type of component and categorize the component in order to proceed with the identification. For each component, the component table includes identification information helpful in identifying the component and internal structure information useful for determining the version of the component.

Figure 4:
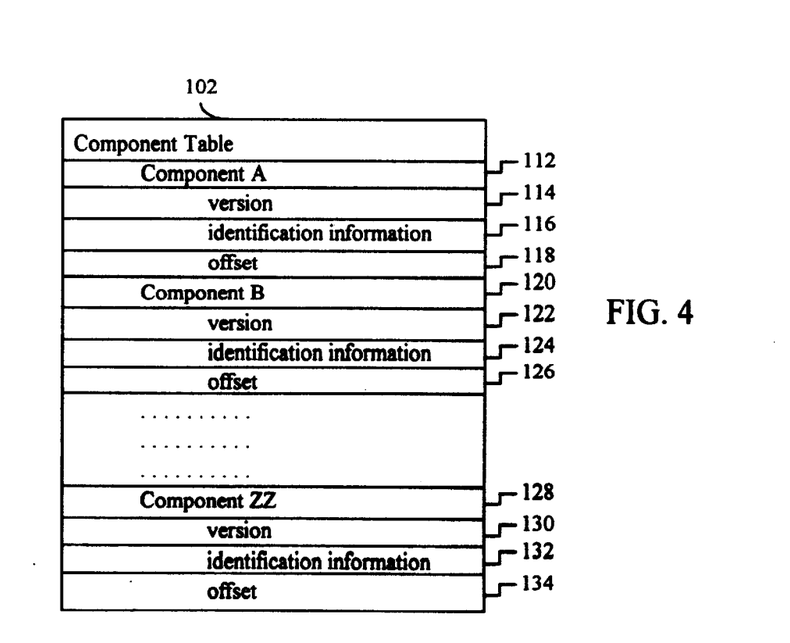
FIG. 4 depicts a component table according to an embodiment of the invention.
Figure 5:
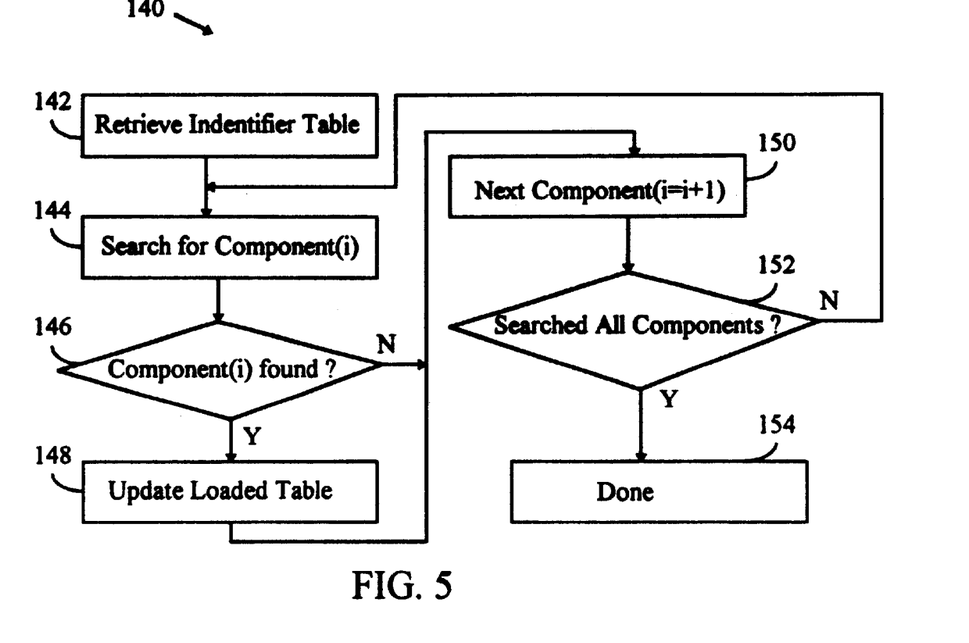
FIG. 5 is a flowchart describing an embodiment of the invention.
Figure 6:
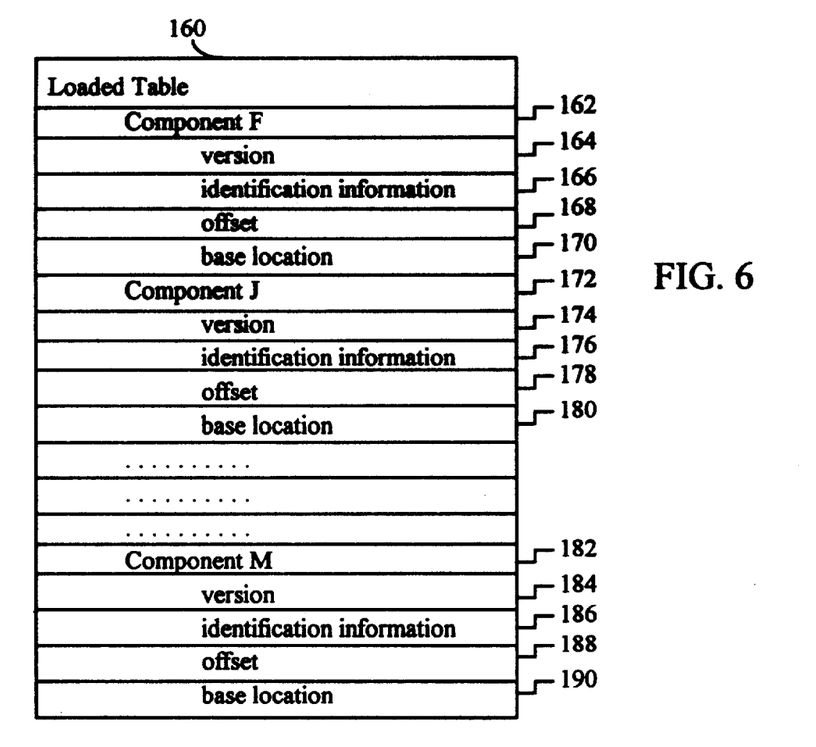
FIG. 6 is a loaded table according to an embodiment of the invention.

An identifier structure 104 employs the component table to interrogate the operating system 70 stored in RAM 16 to determine which components are loaded in the operating system 70. The identifier structure performs functions shown in the FIG. 5 flowchart 140 to update the loaded table with a component and base address in RAM. In step 142, the identifier structure retrieves the component table 102. Step 144 searches RAM 16 for the first component, corresponding to i=1. Step 146 determines whether component(i) is found. If yes, step 150 employs a build structure 105 to update a loaded table 160 to indicate that component(i) is present. If not, step 152 increments i=i+1. Step 154 then determines whether all the components have been searched. If not, step 146 is performed again to search for the incremented component(i). If yes, then the identifier structure has completed it's task and the loaded table is complete, step 156. In the example provided in the exemplary embodiment, the identifier structure identified components F, J, . . . and M in the operating system 70. The loaded table 160 reflects this with information for components F, J, . . . and M. One way to achieve loaded table 160 is to generated a linked list from component table 102. If a component is identified, then a link is set from the last identified component to the newly identified component. If a component is not identified, it is simply overlooked from the list since no link is established to it. One important feature of the identifier structure is to determine the base location of each component in the run-time operating system 70 stored in RAM. Since this information is not necessarily consistent among computers, the base location is important to be defined in the loaded table.

Figure 7:
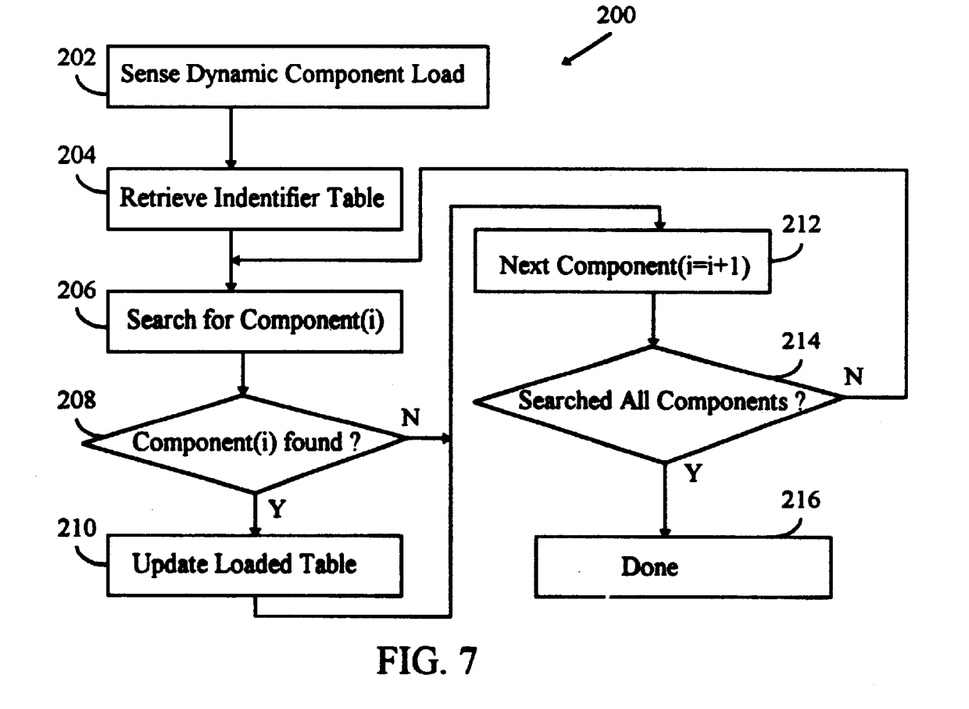
FIG. 7 is a flowchart describing an embodiment of the invention.

Some operating systems have the ability to dynamically load components of the operating system. Windows 95 is such an operating system. In this case, a sensor structure must be established to determine when the operating system performs a dynamic load. FIG. 7 is a flowchart 200 showing how the invention updates the loaded table 160 in response to a dynamic load. In step 202, the identifier structure is called because a dynamic component load was made by the operating system. Step 204 retrieves the component table 102. Step 206 searches RAM 16 for the first component, corresponding to i=1. Step 208 determines whether component(i) is found. If yes, step 210 employs the build structure 105 to update the loaded table 160 to indicate that component(i) is present. If not, step 212 increments i=i+1. Step 214 then determines whether all the components have been searched. If not, step 206 is performed again to search for the incremented component(i). If yes, then the identifier structure has completed it's task and the loaded table is complete, step 216. A benefit to using a linked list loaded table is that when dynamically loaded components are identified, a link is simply established to the newly identified components.

Figure 8:
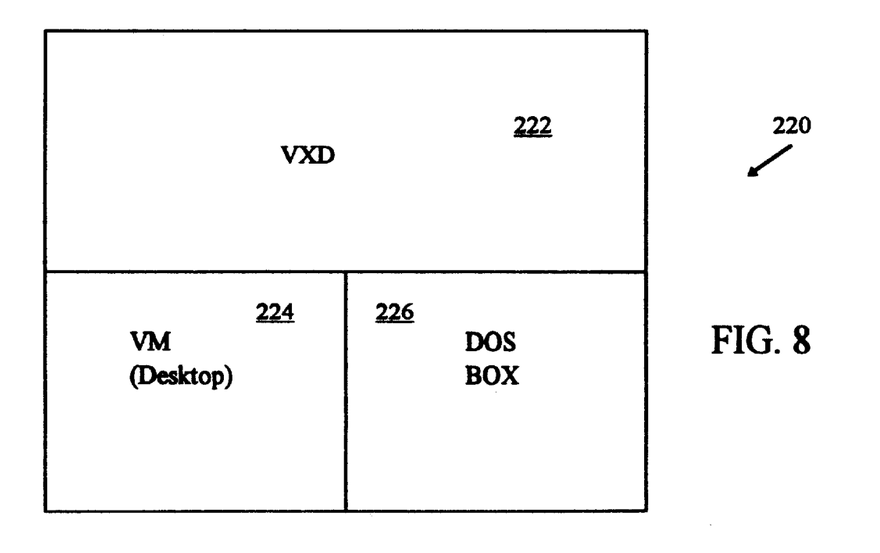
FIG. 8 depicts the Windows 95 operating system.

Once the loaded table is created, other programs can access the loaded table and modify the operating system for beneficial results. For example, the Windows 95 operating system can be modified to support a plurality of users. FIG. 8 is a block diagram for a Windows 95 operating system 220. This operating system has three main portions for storing various components associated with the operating system. Portion 222 stores components such as the VXDs, portion 224 is the virtual machine that provides the desktop functions, and portion 226 is a DOS box that can provide DOS related functions. Portion 222 is important because the VXDs identify critical functions such as disk drive mappings. In order for the operating system to support additional functions, it may be necessary to modify the information in portion 222.

Figure 9:
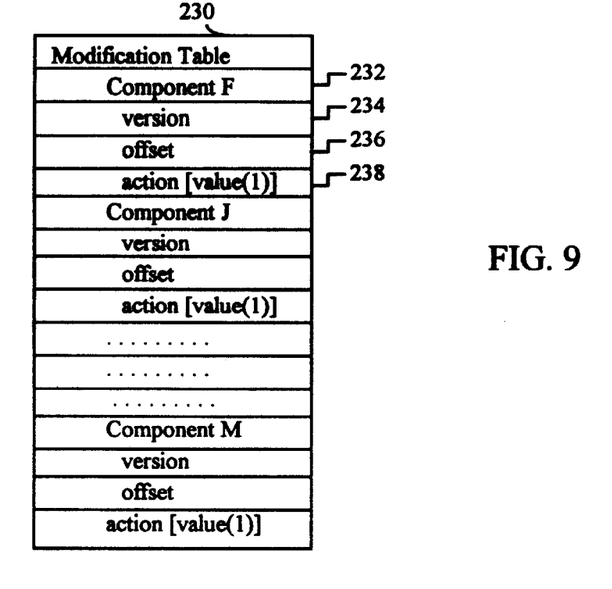
FIG. 9 is a modification table according to an embodiment of the invention.

The loaded table 160 is used in conjunction with a modification table 230 to modify the run-time operating system 70. The modification table includes entries that describe actions required to modify the operating system. Each entry includes the elements (e.g. for Component F): component 232, version 234, offset 236 and action 238. The invention uses this information to modify the operating system when required by an application program. Exemplary actions are to patch the operating system of to modify data at a specified address.

Figure 10:
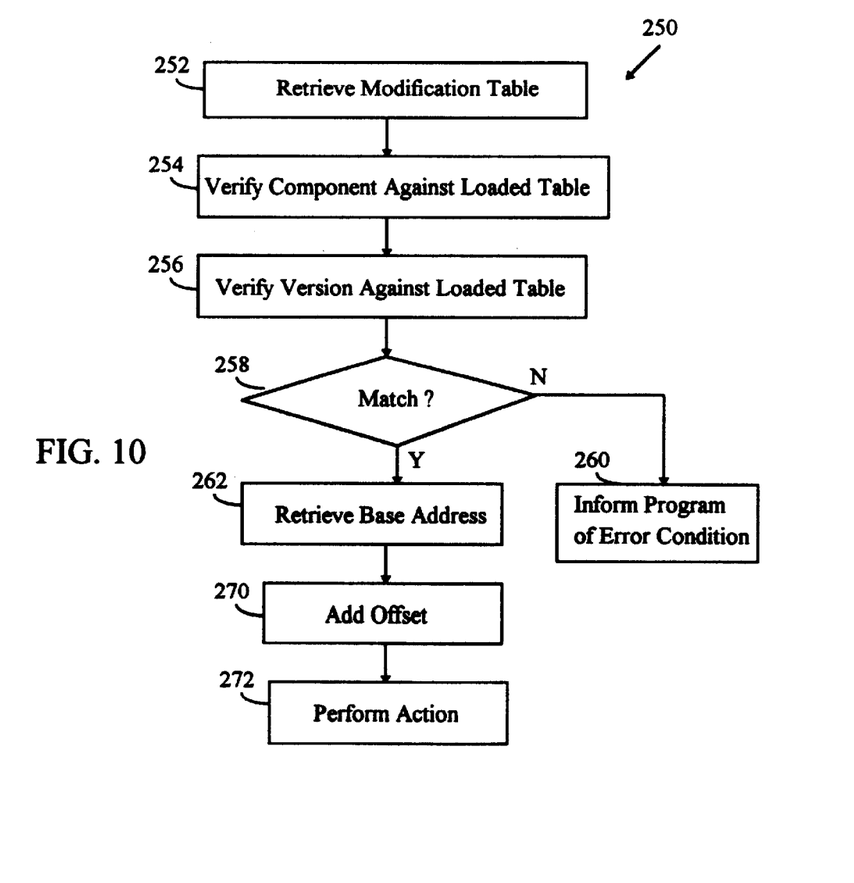
FIG. 10 is a flowchart describing an embodiment of the invention.

An exemplary modification is described with reference to the FIG. 10 flowchart 250. At step 252 the application program desires to modify the run-time operating system 70 and retrieves the modification table. Step 254 verifies the component against the loaded table. Step 256 verifies the version against the loaded table. Step 258 determines whether there is a match between the modification table component and version and the loaded table component and version. If not, step 260 notifies the application program of an error condition. If so, step 262 retrieves the base address of the component to be modified. Step 270 adds an offset to the base address. Step 272 then performs the action specified in the action element (e.g. 238).

Figure 11:
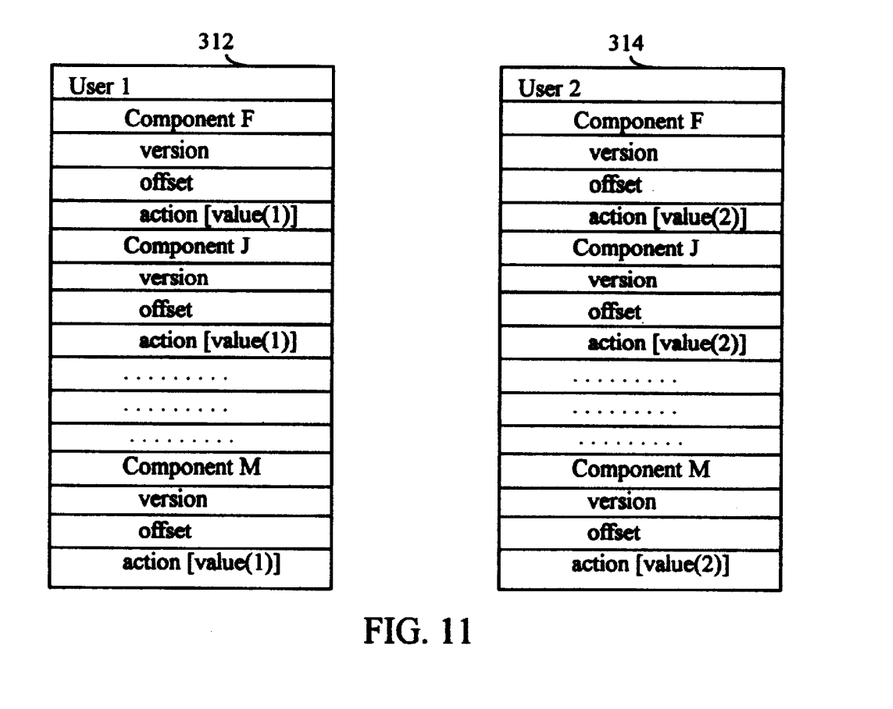
FIG. 11 depicts user tables for use with the Windows 95 operating system.
Figure 12:
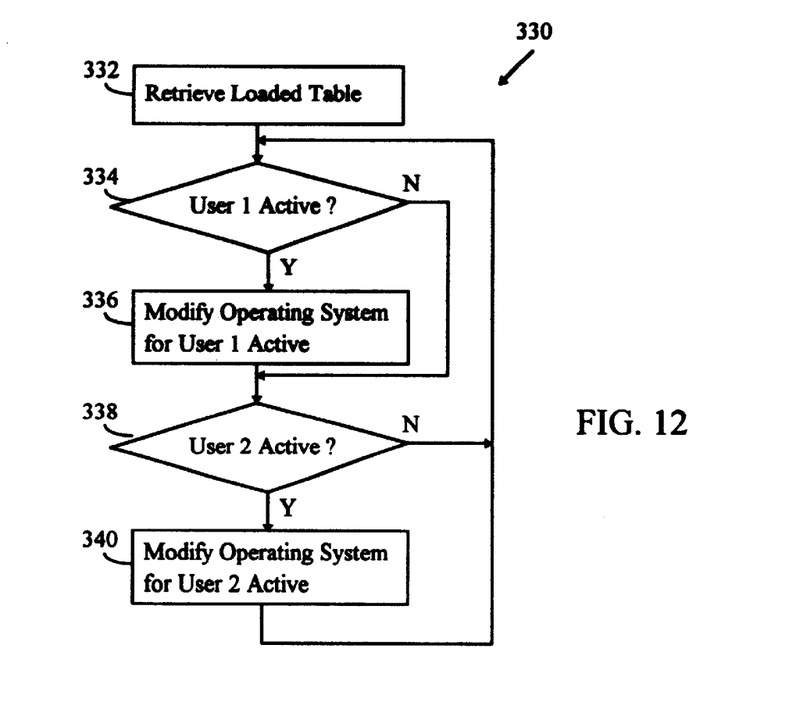
FIG. 12 is a flowchart describing an embodiment of the invention.

In one aspect of the invention that supports two users, one user is served via the VM portion 224 and the other user is served via the DOS box 226. Referring back to FIG. 1, the first user is supported by hardware interfaces 24, 26 and 28 and the second user is supported by hardware interface 30. In order to support each of the users, the operating system must be told what hardware and software components are loaded for each user. In essence, the operating system will need to be modified based on which user is using which components. This is accomplished by creating user tables as shown in FIG. 11. A user 1 has a user table 312 and user 2 has a user table 314. In this description, the user tables (312 and 314) relate to entries in the modification table. The operation of the invention is described with reference to the FIG. 12 flowchart 330. At step 332, the invention retrieves the loaded table 160. Step 334 determines whether user 1 is active. If so, step 336 modifies the operating system 70 to set the components for user 1. In particular, the invention modifies portion 222 of the operating system to instruct the operating system to respond to user 1. If not, or after step 336 is completed, step 338 determines whether user 2 is active. If so, step 340 modifies the operating system 70 to set the components for user 2. In particular, the invention modifies portion 222 of the operating system to instruct the operating system to respond to user 2. If not, or after step 340 is completed, the process returns to step 334. This process continues indefinitely until the computer is shut down. In this manner, the operating system provides complete functionality to two users simultaneously.

Additional users can be supported by the operating system similarly to that described for two users. In this case, the user tables are increased for the number of users and the operating system portion 222 is modified accordingly based on the active user. Moreover, other functions can be added to the operating system using the invention as described herein.

The invention provides many advantages over known techniques. These advantages include the ability to identify and modify loaded components of the computer operating system. As a result, modification programs can provide for additional functionality not originally provided for in the operating system.

Having disclosed exemplary embodiments and the best mode, modifications and variations may be made to the disclosed embodiments while remaining within the scope of the invention as defined by the following claims.

What is claimed is:

1. A structure for use with a computer for identifying components of an operating system, said structure comprising:

a component table including a list of possible components of said operating system;

an identifier structure configured to interrogate said operating system to determine which components in said component table are loaded in said operating system; and a build structure coupled to said identifier structure and configured to compile identified components in said component table and to generate a loaded table of said identified components; a dynamic identifier structure configured to identify components of said operating system that are dynamically activated; and wherein said build structure is configured to dynamically generate said loaded table in order to maintain an updated loaded table of said identified components.

2. The structure of claim 1, further comprising:

a modification structure configured to modify said operating system based at least in part on said identified components.

3. The structure of claim 1, wherein:

said operating system includes at least two portions, including a first portion associated with one state and a second portion associated with a second state, and wherein said first state is for a first user and said second state is for a second user.

4. The structure of claim 3, wherein:

said operating system further includes a third portion for instructing the operating system where to search for loaded components.

5. The structure of claim 4, further comprising:

a modification structure configured such that when said first user is activated components associated with said first user are loaded into said operating system and when said second user is activated components associated with said second user are loaded into said operating system.

6. The structure of claim 3, further comprising:

a modification structure configured such that when said first user is activated components associated with said first user are loaded into said operating system and when said second user is activated components associated with said second user are loaded into said operating system.

7. A method of identifying components of an operating system using a list of possible components of the operating system, comprising the steps of:

interrogating said operating system to determine which components in said component table are loaded in said operating system; and building coupled to said identifier structure and configured to compile identified components in said component table and to generate a loaded table of said identified components; dynamically identified components of said operating system that are dynamically activated; and wherein said building step includes the step of dynamically generating said loaded table in order to maintain an updated loaded table of said identified components.

8. The method of claim 7, further comprising:

modifying said operating system based at least in part on said identified components.

9. The method of claim 7, wherein said operating system includes at least two portions, including a first portion associated with one state and a second portion associated with a second state, and wherein said first state is for a first user and said second state is for a second user, and further comprising:

when said first user is activated, loading components associated with said first user into said operating system; and when said second user is activated, loading components associated with said second user into said operating system.

10. The method of claim 7, wherein said operating system includes at least three portions, including a first portion associated with one state and a second portion associated with a second state, and wherein said first state is for a first user and said second state is for a second user, and a third portion for instructing the operating system where to search for loaded components, and further comprising:

when said first user is activated, loading components associated with said first user into said operating system; and when said second user is activated, loading components associated with said second user into said operating system.

* * * * *

UNITED STATES PATENT AND TRADEMARK OFFICE
CERTIFICATE OF CORRECTION

PATENT NO.    : 6,367,072 B1
DATED         : April 2, 2002
INVENTOR(S)   : Justice et al.

It is certified that error appears in the above-identified patent and that said Letters Patent is hereby corrected as shown below:

<u>Title page,</u>
Item [*] Notice, delete the phrase "by 0 days" and insert -- by 27 days --

Signed and Sealed this

Eighteenth Day of May, 2004

JON W. DUDAS
*Acting Director of the United States Patent and Trademark Office*